Feb. 8, 1949. D. G. REMPEL 2,460,845
FORM FOR BUILDING HOLLOW ARTICLES
Filed July 14, 1944 3 Sheets-Sheet 1
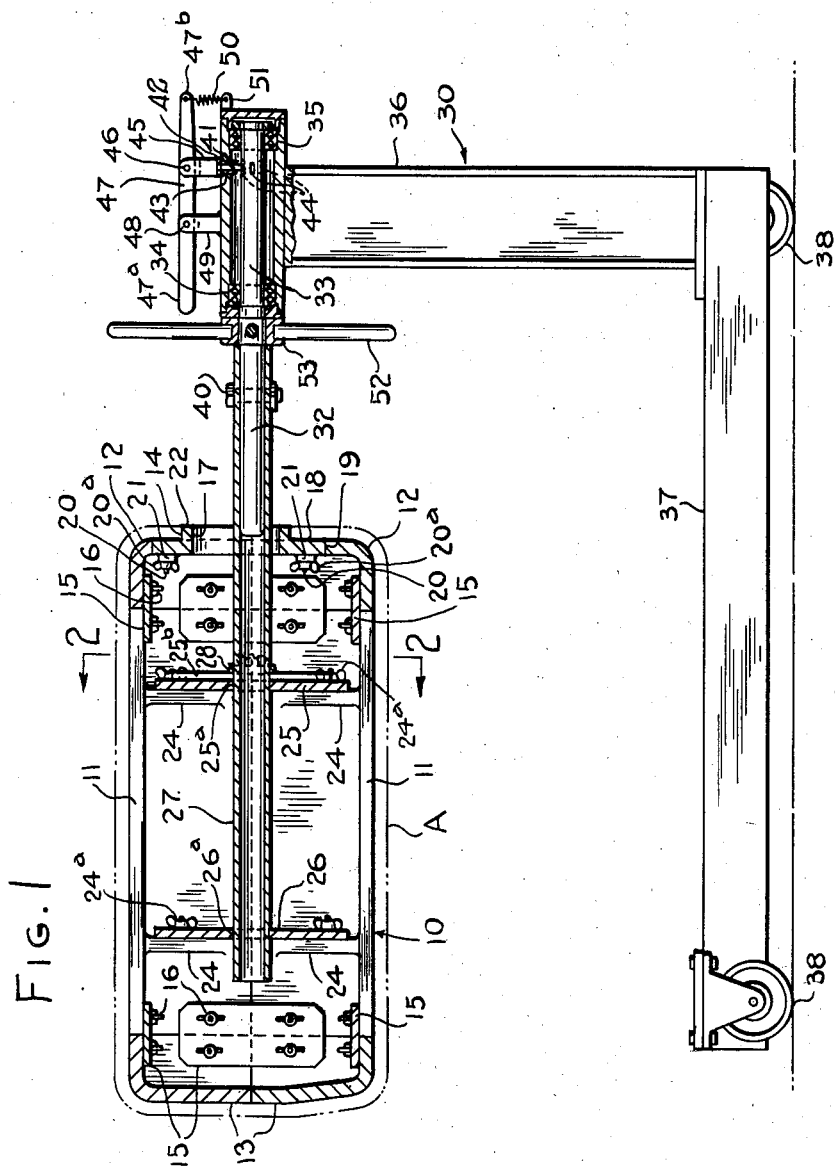
INVENTOR.
Dietrich G. Rempel
BY William Cleland
Attorney Feb. 8, 1949.  D. G. REMPEL  2,460,845
FORM FOR BUILDING HOLLOW ARTICLES
Filed July 14, 1944  3 Sheets-Sheet 2

INVENTOR.
Dietrich G. Rempel
BY William Cleland
Attorney

Feb. 8, 1949.      D. G. REMPEL      2,460,845
FORM FOR BUILDING HOLLOW ARTICLES
Filed July 14, 1944                    3 Sheets-Sheet 3
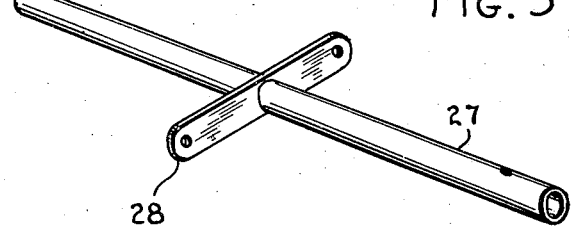
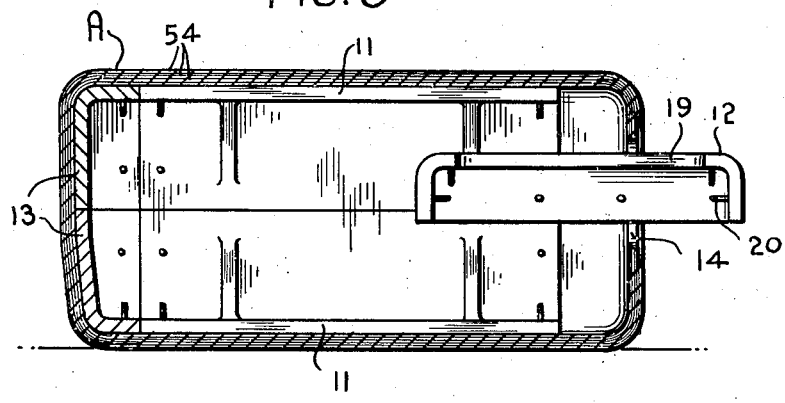
INVENTOR.
Dietrich G. Rempel
BY
William Cleland
Attorney Patented Feb. 8, 1949

2,460,845

UNITED STATES PATENT OFFICE 2,460,845

FORM FOR BUILDING HOLLOW ARTICLES

Dietrich G. Rempel, Akron, Ohio, assignor to The Sun Rubber Company, Barberton, Ohio, a corporation of Ohio Application July 14, 1944, Serial No. 544,859

6 Claims. (Cl. 18—45)

This invention relates to forms for building hollow articles, and more particularly relates to forms for fabrication of articles such as airplane fuel cells which are provided with relatively small access openings.

Heretofore one of the best known methods for production of airplane fuel cells, for example, has been to build layers of heat fusible material, such as rubberized fabric plies, on hollow forms or shells of relatively stiff but frangible material, such as plaster of Paris, cardboard or the like, then to remove the form through the access openings of the articles, as by breaking or otherwise destroying the forms and thereafter inserting flexible elastic pressure bags in the article and curing the same in a suitable mold. This method was unsatisfactory in many respects. For example, new accurately built forms were required for each separate article, and an expensive pressure bag was also required, this bag being cumbersome to insert in or to remove from the articles. Obviously this was an uneconomical and wasteful procedure. Other known and accepted methods utilized in the past have been similarly uneconomical and wasteful, as to time, labor, materials, and equipment.

An object of this invention is to provide an improved form for building hollow articles of the character described, which form may be used repeatedly, the necessity for destruction thereof for removing the same from articles built on it being obviated.

Another object of the invention is to provide a form for building articles of the character described, which form may be utilized for supporting an article built thereon during a curing or vulcanization process thereof in a mold, wherein the articles are formed under the influence of heat and pressure, and by which is obviated the necessity of using a separate pressure bag during said vulcanizing or curing process.

Still another object of the invention is to provide apparatus of the character described, which greatly facilitates the building of airplane fuel cells or the like, and by which is made possible a substantial saving in time, labor, material, equipment, etc., required to produce such articles.

These and other objects of the invention will be manifest from the following brief description and the accompanying drawings.

This application is a continuation in part of application Serial Number 537,773, filed May 29, 1944, and now Patent No. 2,420,443.

Of the accompanying drawings:

Figure 1 is a side elevation partly broken away and in section, of apparatus embodying the invention.

Figure 5 is a perspective view of a supporting element removed from the building form.

Figure 6 is a cross-section through a building form and article built thereon, illustrating the manner of removing various parts of the form through an access opening in the article.

Figure 3:
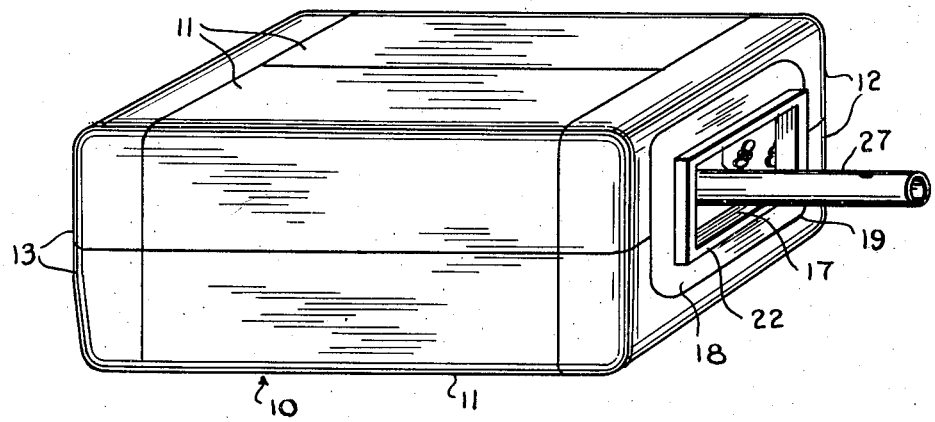
Figure 3 is a perspective view of a collapsible building form embodied in the invention, the same being removed from its support.
Figure 2:
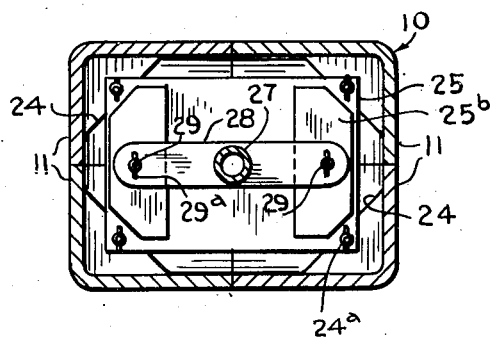
Figure 2 is a cross-section taken substantially on line 2—2 of Figure 1.

Referring particularly to Figures 1, 2 and 3 the numeral 10 designates a collapsible form for building fuel cells for airplanes, said form being of suitable material such as metal, wood, hard plastic, etc., and in the present example, being generally box-like in shape corresponding to the shape of a cell to be built, as indicated in chain-dotted lines in Figure 1. Form 10 may be removably mounted on a stand or support 30, as shown in Figure 1, and as will be described later.

The collapsible form 10 may comprise a hollow shell, the central portion of which is divided into four similar parts or segments 11, 11 which are somewhat shorter than the total length of the form and which are L-shaped in cross-section, and two end portions or caps each of which is divided into pairs of end segments 12, 12 and 13, 13, respectively, the split between mating end segments extending widthwise of the form, as shown in Figure 3. By this manner of dividing the shell or form 10 into segments, all of the segments may be of maximum size which will still permit endwise passage thereof through the access openings 14 of articles A built on the assembled form, as will subsequently be described. All of these segments may be releasably secured in assembled relation as by means of splice plates 15, 15 at adjoining corners of the segments, said plates being secured by means of bolts and wing-nuts indicated at 16, 16. As shown, each segment in general has its perimetrical edges in abutment with the corresponding edge portions of adjacent segments.

Figure 4:
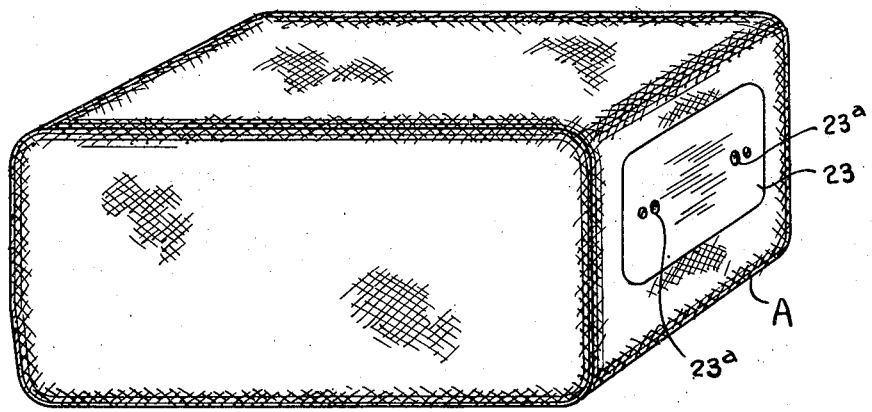
Figure 4 is a similar perspective view illustrating an airplane fuel cell built on the building form.

An opening 17, corresponding to access opening 14 in article A, is provided in a rectangular frame 18 received in a relatively larger opening 19 in end segments 12, frame 18 being releasably secured to segments 12 as by means of bolts 20 received through apertures in the segments and in lugs 21, 21 on the frame, and these bolts being provided with wing-nuts 20ª. An outwardly projecting peripheral flange 22 on frame 18 facilitates forming the access openings 14 in articles A being built on the form (see Figure 1). Frame 18 is removable from the form for curing or vulcanizing operations of articles A retained thereon, the provision of the relatively large opening 19 in the form permitting clamping of a sealing device 23 around said openings (see Figure 4) to seal the same for application of internal pressure during said curing operations, substantially as set forth in co-pending application Serial Number 537,773 filed May 29, 1944.

The segments 11, 11 are provided with triangular reinforcing ribs 24, 24 in the corners thereof, these ribs being arranged to be in two series of four in longitudinally spaced planes, as best shown in Figure 1. Releasably secured to ribs 24, by means of bolts and wing-nuts 24ª, to be at spaced points within the form 10, may be bearing plates 25 and 26, these plates having central apertures 25ª and 26ª, respectively, for reception of a tubular supporting element or sleeve 27 adapted to extend along a longitudinal axis of form 10 and projecting outwardly through opening 17 to a substantial extent. Relative rotation between sleeve 27 and form 10 is prevented by means of an integral crosspiece 28 on the sleeve releasably secured to plate 25 by means of bolts 29 extending through bearing plate 25, spacer members 25ᵇ, 25ᵇ and crosspiece 28, at spaced points on opposite sides of the sleeve, wing-nuts 29ª being threaded on the bolts 29.

The outwardly extending portion of sleeve 27 is receivable on a horizontally extending spindle 32, having an extension 33 thereof journalled in bearings 34, 34 in a housing 35 at the top of an upright 36 of stand 30, the upright being mounted on a suitable base 37 on which may be wheels or rollers 38, 38 to facilitate movability of the stand 30. Relative rotation of form 10 on spindle 32 is prevented by means of a removable pin or bolt 40 extending through apertures in the sleeve 27 and spindle 32 (see Figure 1).

The form 10 may be releasably locked in various positions of rotation about the longitudinal axis of the form and spindle by means of a pin 41, secured in a bushing 42 slidable in an aperture 43 in housing 35, the inner end of the pin 41 being selectively engageable in circumferentially spaced slots 44 in spindle extension 33. The pin 41 may be selectively engaged in said slots by means of an upward extension 45 on the bushing 42 being pivoted at 46 to an operating lever 47, pivotally connected at 48 to a bifurcated lug 49 on the housing 35. The lever 47 is manually operated by means of a handle extension 47ª at one end thereof, against yielding action of a spring 50 extending between lug 51 on housing 35 and an extension 47ᵇ at the other end of lever 47. The spindle 32 may be rotated to various angularly adjusted positions of the form 10, while pin 41 is in released condition, by means of hand grips 52 on a boss 53 keyed to the spindle adjacent the housing 35.

In the operation and use of the improved apparatus described above, the form 10 is assembled as previously described, on a convenient surface, with the sleeve 27 mounted therein as shown in Figure 3. The form may now be mounted on the stand 30 by applying the outward extension of sleeve 27 on spindle 32 and securing the same against relative rotation by means of bolt or pin 40 (see Figure 1). An article is then built or pre-formed on the form, while the same is locked in various angularly adjusted positions as required, by means of the pin 41 engaging in spindle extension 33. The article may, for example, be built on the form by application of a plurality of pre-cut plies 54, 54 of flexible sheet material such as rubber, rubberized fabric, phenolic resin or other heat fusible material, after which the form with the preformed article thereon is removed from stand 30.

After removing the sleeve unit 27 (see Figure 5) by releasing the bolts 29 and wing-nuts 29ª, and removing the frame 18 by releasing bolts 20 and wing-nuts 20ª, the sealing device 23 may be clamped in the opening 14 of the preformed article. The article and form 10 are next placed in a suitable vulcanizer (not shown) for a curing or a vulcanizing operation such as in the manner described in the aforementioned co-pending application. While the article is subjected to application of heat in said mold, fluid-pressure medium, such as air or steam, is applied to the interior of the form, through suitable means (not shown) which may be connected to sealing device 23 through apertures 23ª, 23ª therein. As the joints between the form segments or section 11, 12 and 13 are not fluid-pressure tight, due to inherent slight irregularities between abutting machined surfaces, the fluid-pressure medium is conveyed or forced through the joints and applied directly against the interior wall surface of the article, thereby uniformly to press the article against the mold cavity surface. In this manner the article will be effectively formed to desired finished shape, the plies thereof being uniformly bonded into an integral structure. This use of the form 10, of course, eliminates the necessity of using a rubber or like pressure bag to apply pressure within the article while it is being cured.

Upon removal of the completed article from the vulcanizer (not shown) the sealing device 23, as well as other sealing devices (not shown) which may have been used as for preforming fitting or like openings, the various parts of the form 10, including the plates 25, 26, splice plates 15 and the segments 11, 12 and 13 may be removed through the opening 14 of the article substantially in the manner illustrated in Figure 6, wherein a segment 12 is being removed endwise through the opening.

When all the parts of the form 10 have thus been removed from the article they may be reassembled as previously described and as shown in Figures 1, 2 and 3, for a subsequent article building operation.

Thus has been provided improved apparatus for building hollow fabricated articles of the character described, which accomplishes the stated objects of the invention.

Modifications of the invention may be resorted to without departing from the spirit thereof or the scope of the appended claims.

What is claimed is:

1. A form for building hollow articles having an opening therein, comprising a hollow segmental shell having an opening corresponding to the opening of articles to be built on the shell, releasable means for securing the segments of said shell in assembled relation; a supporting element receivable through said openings in said shell and in articles built thereon; means for releasably securing said supporting element on the inside of said shell; a support; a member rotatably mounted on said support; means for removably mounting said supporting element on said member, and releasable means for locking said member against rotation in different positions on said support, said segments and associated parts within said shell being removable through said openings in articles built on the shell.

2. A form for building hollow articles having an opening therein, comprising a hollow segmental shell having an opening corresponding to the opening of articles to be built on the shell, releasable means for securing the segments of said shell in assembled relation, a supporting element receivable through said openings in said shell and in articles built thereon, means for releasably securing said supporting element on the inside of said shell, a base, an upright on said base, a spindle mounted on said upright, to be rotatable on a substantially horizontal axis, means for removably mounting said supporting element on said spindle, and releasable means for locking said spindle against rotation in different positions on said upright, said segments and associated parts within said shell being removable through said openings in articles built on the shell.

3. A form for building hollow articles having an opening therein, comprising a hollow segmental shell having an opening therein, corresponding to said openings of the articles, means for securing said segments in assembled relation to form the shell, said segments having inwardly extending portions adapted to be cooperatively arranged at spaced points within the shell, a plurality of apertured bearing members, means for releasably securing said bearing members to said inwardly extending portions at said spaced points, a supporting element receivable through said opening of the shell and through the apertures of said bearing members, and means for securing said supporting element against relative rotational movement in said bearing members.

4. A form for building hollow articles having an opening therein, comprising a hollow segmental shell having an opening therein, corresponding to said openings of the articles, means for securing said segments in assembled relation to form the shell, said segments having inwardly extending portions adapted to be cooperatively arranged at spaced points within the shell, a plurality of apertured bearing members, means for releasably securing said bearing members to said inwardly extending portions at said spaced points, a supporting element receivable through said openings of the shell and through the apertures of said bearing members, means for securing said supporting element against relative rotational movement in said bearing members, a base, an upright on said base, a spindle mounted on said upright to be rotatable on a substantially horizontal axis, means for removably mounting said supporting element on said spindle, and releasable means for locking said spindle against rotation in different positions on said upright.

5. A form for building hollow articles having an opening therein, comprising a hollow segmental shell having an opening therein corresponding to said openings of the articles, releasable means for securing said segments in assembled relation to form the shell, said segments having inwardly extending portions adapted to be cooperatively arranged at spaced points within the shell, a plurality of apertured bearing members, means for releasably securing said bearing members to said inwardly extending portions at said spaced points, a supporting element receivable through said opening of the shell and through the apertures of said bearing members, means for securing said supporting element against relative rotational movement in said bearing members, a base, an upright on said base, a spindle mounted on said upright to be rotatable on a substantially horizontal axis, gripping means for rotating said spindle on said upright, means for removably mounting said supporting element on said spindle, and releasable means for locking said spindle against rotation in different positions on said upright.

6. A form for building hollow articles having an opening therein, comprising a hollow segmental shell having an opening therein corresponding to said openings of the articles, releasable means for securing said segments in assembled relation to form the shell, said segments having inwardly extending portions adapted to be cooperatively arranged at spaced points within the shell, a plurality of apertured bearing members, means for releasably securing said bearing members to said inwardly extending portions at said spaced points, a supporting element receivable through said opening of the shell and through the apertures of said bearing members, and means for securing said supporting element against relative rotational movement in said bearing members, said segments and associated parts within said shell being of such proportions as to be receivable through said openings of articles built on the shell.

DIETRICH G. REMPEL.

REFERENCES CITED

The following references are of record in the file of this patent:

UNITED STATES PATENTS

| Number | Name | Date |
|---|---|---|
| 415,251 | Meyer | Nov. 19, 1889 |
| 2,077,506 | Woock | Apr. 20, 1937 |
| 2,132,324 | Schrank | Oct. 4, 1938 |
| 2,331,087 | Warman | Oct. 5, 1943 |
| 2,335,169 | Bostwick | Nov. 23, 1943 |
| 2,343,292 | Greneker | Mar. 7, 1944 |
| 2,348,935 | Smith et al. | May 16, 1944 |
| 2,360,899 | Scharenberg | Oct. 24, 1944 |
| 2,374,386 | Shakesby | Apr. 24, 1945 |